(12) United States Patent
Amos et al.

(10) Patent No.: US 10,800,871 B2
(45) Date of Patent: Oct. 13, 2020

(54) FLUOROCHEMICAL COMPOSITIONS AND METHODS

(71) Applicant: 3M INNOVATIVE PROPERTIES COMPANY, St. Paul, MN (US)

(72) Inventors: David T. Amos, St. Paul, MN (US); Jay R. Nierengarten, St. Paul, MN (US); Angela J. Nixon, Rosemount, MN (US); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 302 days.

(21) Appl. No.: 15/767,259

(22) PCT Filed: Oct. 6, 2016

(86) PCT No.: PCT/US2016/055741
§ 371 (c)(1),
(2) Date: Apr. 10, 2018

(87) PCT Pub. No.: WO2017/066073
PCT Pub. Date: Apr. 20, 2017

(65) Prior Publication Data
US 2019/0077903 A1   Mar. 14, 2019

Related U.S. Application Data

(60) Provisional application No. 62/240,016, filed on Oct. 12, 2015.

(51) Int. Cl.
| | | |
|---|---|---|
| *C08G 18/28* | (2006.01) | |
| *C09D 175/04* | (2006.01) | |
| *C08G 18/48* | (2006.01) | |
| *C08G 18/79* | (2006.01) | |
| *C08G 18/38* | (2006.01) | |
| *C08G 18/62* | (2006.01) | |

(52) U.S. Cl.
CPC ....... *C08G 18/2885* (2013.01); *C08G 18/283* (2013.01); *C08G 18/3812* (2013.01); *C08G 18/3872* (2013.01); *C08G 18/4825* (2013.01); *C08G 18/4833* (2013.01); *C08G 18/6279* (2013.01); *C08G 18/792* (2013.01); *C09D 175/04* (2013.01)

(58) Field of Classification Search
CPC .............. C08G 18/2885; C08G 18/283; C08G 18/3812; C08G 18/3872; C08G 18/4825; C08G 18/4833; C08G 18/6279; C08G 18/792; C09D 175/04
See application file for complete search history.

(56) References Cited

U.S. PATENT DOCUMENTS

| | | | | |
|---|---|---|---|---|
| 5,350,795 A | * | 9/1994 | Smith | ................ C08G 18/4825 |
| | | | | 428/423.1 |
| 6,525,127 B1 | * | 2/2003 | Jariwala | ................ C07C 323/52 |
| | | | | 524/462 |
| 6,890,360 B2 | | 5/2005 | Cote | |
| 7,078,456 B2 | | 7/2006 | Jariwala | |
| 10,030,334 B2 | * | 7/2018 | Coppens | ............. D06M 15/576 |
| 2004/0077237 A1 | | 4/2004 | Audenaert | |
| 2014/0302267 A1 | | 10/2014 | Wynne | |
| 2014/0308503 A1 | | 10/2014 | Tamura | |

FOREIGN PATENT DOCUMENTS

| | | |
|---|---|---|
| WO | WO 2000-24815 | 5/2000 |
| WO | WO 2001-30873 | 5/2001 |

OTHER PUBLICATIONS

International Search Report for PCT International Application No. PCT/US2016/055741, dated Feb. 16, 2017, 4 pages.

* cited by examiner

*Primary Examiner* — Michael L Leonard
(74) *Attorney, Agent, or Firm* — Sandra K. Nowak

(57) ABSTRACT

A fluorochemical composition that includes one or more fluorochemical urethane compounds, a method of treating a substrate (e.g., a method for imparting water and oil repellency and antisoiling characteristics to a substrate), and an article having a fluorochemical composition coating thereon.

18 Claims, No Drawings

FLUOROCHEMICAL COMPOSITIONS AND METHODS

BACKGROUND

There is a continuing need for compositions that provide protective properties (e.g., water and oil repellency and antisoiling characteristics) to substrates, particularly fibrous substrates.

SUMMARY OF THE DISCLOSURE

The present disclosure provides a fluorochemical composition, a method of treating a substrate (e.g., a method for imparting water and oil repellency and antisoiling characteristics to a substrate), and an article having a fluorochemical composition coating thereon.

In one embodiment, there is provided a fluorochemical composition that includes one or more fluorochemical urethane compounds. The one or more fluorochemical urethane compounds includes the reaction product of components that include:

(a) a polyfunctional isocyanate compound (herein "polyfunctional" includes difunctionality as well as higher functionality);
(b) a polyoxyalkylene compound;
(c) a monofunctional fluorochemical compound; and
(d) a functional fluorochemical oligomeric compound.

It will be understood by one of skill in the art upon reading the present disclosure that the fluorochemical urethane compounds may be the reaction product of all of reactants (a) through (d) to form one compound, or only two or three of such reactants. That is, the fluorochemical compositions typically include two or more fluorochemical urethane compounds that result from a reaction of two or more of components (a) through (d). At least one fluorochemical urethane compound in a fluorochemical composition of the present disclosure is the reaction product of all reactants (a) through (d).

The functional fluorochemical oligomeric compound is of the formula:

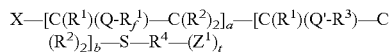

wherein:
the sum of a+b is a number such that the compound is oligomeric, and a is at least 1;
t is 1 or 2;
each $R^1$ is independently hydrogen, a halogen, or a straight chain or branched chain (C1-C4)alkyl group;
each $R^2$ is independently hydrogen or a straight-chain or branched-chain (C1-C4)alkyl group;
Q and Q' are each independently a covalent bond or an organic linking group;
$R_f^1$ is a fluoroaliphatic group comprising a fully fluorinated terminal group;
$R^3$ is a fluorine-free aliphatic group having 12 or more carbon atoms;
X is hydrogen or a group derived from a free radical initiator;

$R^4$ is a divalent or trivalent organic linking group (a divalent linking group when t=1 and a trivalent linking group when t=2); and
$Z^1$ is —$NH_2$, —SH, —OH, —N=C=O, or —$NR^5H$; wherein $R^5$ is selected from phenyl, straight and branched aliphatic, alicyclic, and aliphatic ester groups.

In another embodiment, there is provided an article that includes a substrate having one or more surfaces and a composition as described herein coated on one or more surfaces of the substrate.

In another embodiment, there is provided a method for treating a substrate (e.g., a method for imparting water and oil repellency and antisoiling characteristics to a substrate). The method includes applying a treating composition that includes a fluorochemical composition as described herein, and allowing the treating composition to dry.

The term "oligomeric" or "oligomer" means a polymer that consists of relatively few repeating units (typically, no more than 25 repeating units).

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Herein, when a group is present more than once in a formula described herein, each group is "independently" selected, whether specifically stated or not. For example, when more than one $R^1$ group is present in a formula, each $R^1$ group is independently selected. Furthermore, subgroups contained within these groups are also independently selected.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides a fluorochemical composition, a method of imparting water and oil repellency and antisoiling characteristics to a substrate, and an article having a fluorochemical composition coating thereon.

A fluorochemical composition includes a fluorochemical urethane compound that is a reaction product of components (i.e., reactants) including: (a) a polyfunctional isocyanate compound; (b) a polyoxyalkylene compound; (c) a monofunctional fluorochemical compound; and (d) a functional fluorochemical oligomeric compound.

The resultant fluorochemical urethane compounds may be the reaction product of all of reactants (a) through (d) to form one compound, or only two or three of such reactants. That is, the fluorochemical compositions typically include two or more fluorochemical urethane compounds that result from a reaction of two or more of components (a) through (d). At least one fluorochemical urethane compound in a fluorochemical composition of the present disclosure is the reaction product of all reactants (a) through (d).

Exemplary, but nonlimiting, fluorochemical urethane compounds within such composition include the following:

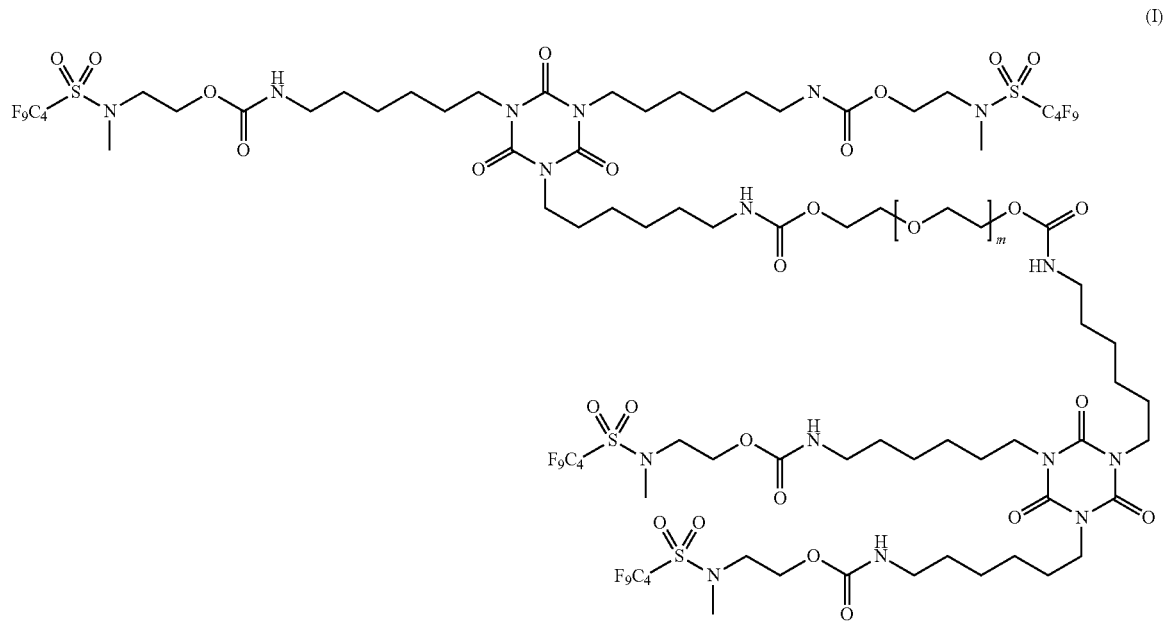

(the product of reactants (a), (b), and (c))

and
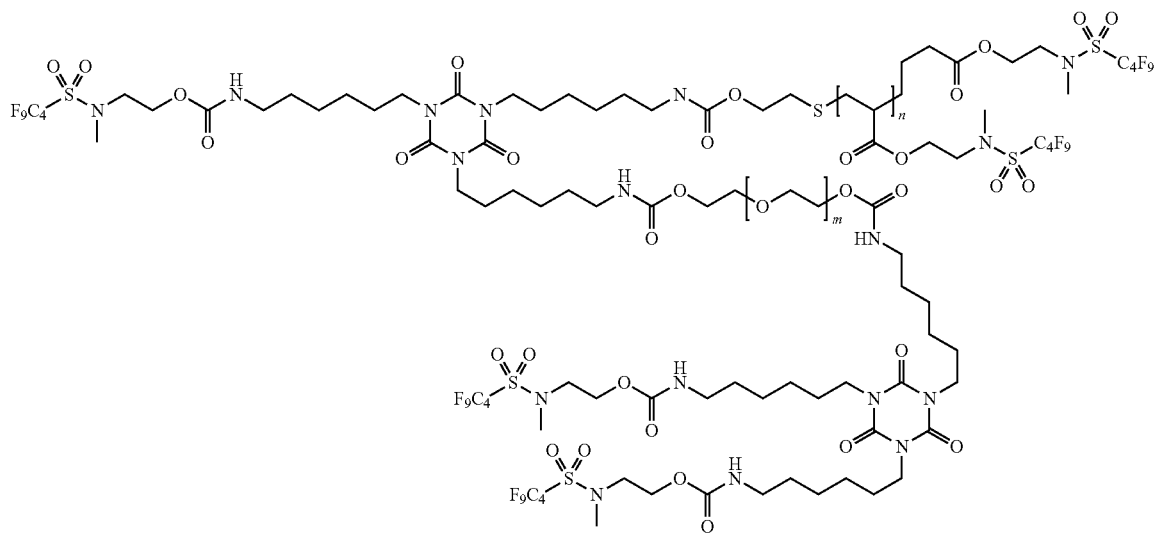
(II)
(the product of reactants (a), (b), (c), and (d))
The fluorochemical compositions prepared from the reactants (a)-(d) described herein may include additional minor amounts (relative to the presence of the compounds of formulas (I) and (II)) of fluorochemical urethane compounds such as:
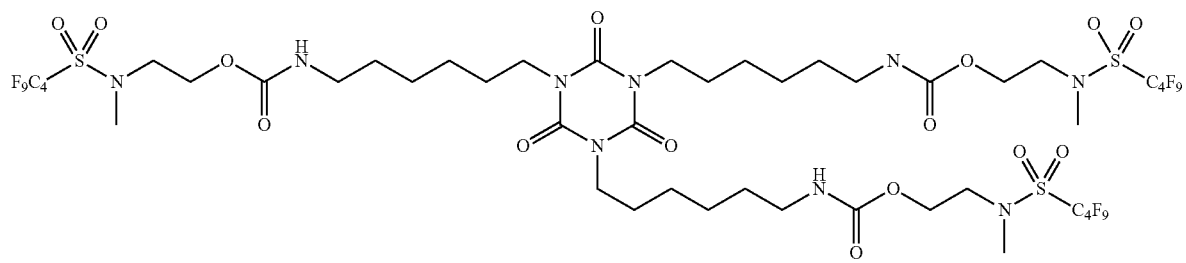
(III)
(the product of reactants (a) and (c))
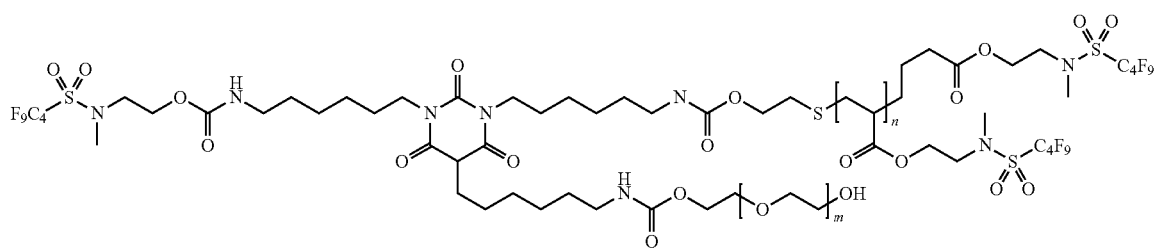
(IV)
(the product or reactants (a), (b), (c), and (d))

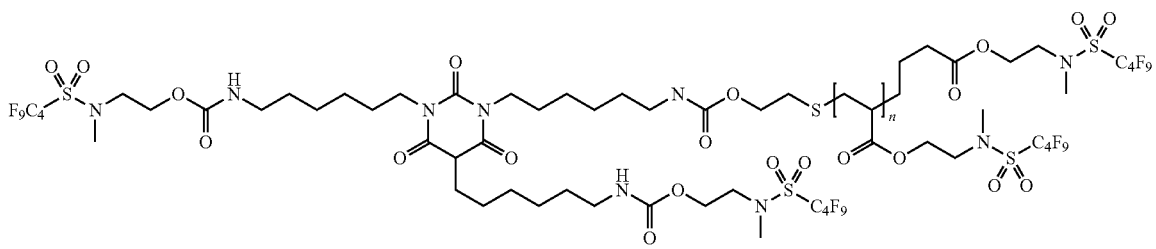

(V)

(the product of reactants (a), (c), and (d))

In formulas (I), (II), (III), and (IV), "m" is the number of repeating oxy-ethylene units, and "n" is the number of repeating fluorochemical oligomer units.

In certain embodiments of formulas (I), (II), and (IV), the value of "m" (oxy-ethylene repeat units) is at least 20, or at least 25, or at least 30. In certain embodiments of formulas (I), (II), and (IV), the value of "m" (oxy-ethylene repeat units) is up to 50, or up to 40, or up to 36. In certain embodiments of formulas (I), (II), and (IV), the value of "m" (oxy-ethylene repeat units) is 20-50, or 25-40, or 30-36.

In certain embodiments of formulas (II), (IV), and (V), the value of "n" (fluorochemical oligomer repeat unit) is at least 3. In certain embodiments of formulas (II), (IV), and (V), the value of "n" (fluorochemical oligomer repeat unit) is up to 20, or up to 10, or up to 7. In certain embodiments of formulas (II), (IV), and (V), the value of "n" (fluorochemical oligomer repeat unit) is 3-20, or 3-10, or 3-7.

Functional Fluorochemical Oligomeric Compound (Component (d))

The functional fluorochemical oligomeric compound is of the formula:

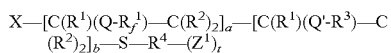

wherein:
the sum of a+b is a number such that the compound is oligomeric, and a is at least 1;
t is 1 or 2 (i.e., a "monofunctional" compound with respect to $Z^1$ when t=1 or a "difunctional" compound with respect to $Z^1$ when t=2);
each $R^1$ is independently hydrogen, a halogen, or a straight chain or branched chain (C1-C4) alkyl group;
each $R^2$ is independently hydrogen or a straight-chain or branched-chain (C1-C4)alkyl group;
Q and Q' are each independently a covalent bond or an organic linking group;
$R_f^1$ is a fluoroaliphatic group comprising a fully fluorinated terminal group;
$R^3$ is a fluorine-free aliphatic group having 12 or more carbon atoms;
X is hydrogen or a group derived from a free radical initiator;
$R^4$ is a divalent organic linking group when t=1 or a trivalent organic linking group when t=2; and
$Z^1$ is —$NH_2$, —SH, —OH, —N=C=O, or —$NR^5H$;
wherein $R^5$ is selected from phenyl, straight and branched aliphatic, alicyclic, and aliphatic ester groups.

In certain embodiments of the functional fluorochemical oligomeric compound, the sum of a+b is at least 3. In certain embodiments, the sum or a+b is up to 25. In certain embodiments, the sum of a+b of the functional fluorochemical oligomeric compound is 3 to 20.

In certain embodiments of the functional fluorochemical oligomeric compound, a is at least 1. In certain embodiments, a is 4.

In certain embodiments of the functional fluorochemical oligomeric compound, b is 0.

In certain embodiments of the functional fluorochemical oligomeric compound, a is 4 and b is 0.

In certain embodiments of the functional fluorochemical oligomeric compound, t=1.

In certain embodiments of the functional fluorochemical oligomeric compound, each $R^1$ is independently H or Me.

In certain embodiments of the functional fluorochemical oligomeric compound, each $R^2$ is independently H.

In certain embodiments of the functional fluorochemical oligomeric compound, Q and Q' are each independently selected from the following structures:

—$SO_2NR^8(CH_2)_kO(O)C$—
—$CONR^8(CH_2)_kO(O)C$—
—$(CH_2)_kO(O)C$—
—$CH_2CH(OR^9)CH_2O(O)C$—
—$(CH_2)_kC(O)O$—
—$(CH_2)_kSC(O)$—
—$(CH_2)_kO(CH_2)_kO(O)C$—
—$(CH_2)_kS(CH_2)_kO(O)C$—
—$(CH_2)_kSO_2(CH_2)_kO(O)C$—
—$(CH_2)_kS(CH_2)_kOC(O)$—
—$(CH_2)_kSO_2NR^8(CH_2)_kO(O)C$—
—$(CH_2)_kSO_2$—
—$SO_2NR^8(CH_2)_kO$—
—$SO_2NR^8(CH_2)_k$—
—$(CH_2)_kO(CH_2)_kC(O)O$—
—$(CH_2)_kSO_2NR^8(CH_2)_kC(O)O$—
—$(CH_2)_kSO_2(CH_2)_kC(O)O$—
—$CONR^8(CH_2)_kC(O)O$—
—$(CH_2)_kS(CH_2)_kC(O)O$—
—$CH_2CH(OR^9)CH_2C(O)O$—
—$SO_2NR^8(CH_2)_kC(O)O$—
—$(CH_2)_kO$—
—$C_kH_{2k}OC(O)NH$—
—$C_kH_{2k}NR^8C(O)NH$—
—$OC(O)NR^8(CH_2)_k$—
—$(CH_2)_kNR^8$—
and
—$(CH_2)_kNR^8C(O)O$—
wherein:
each k is independently 0 to 20;
$R^8$ is hydrogen, an aryl group, or a (C1-C4)alkyl group; and
$R^9$ is (C1-C20)alkyl group.

In certain embodiments of the functional fluorochemical oligomeric compound, $R_f^1$ has the structure $C_oF_{2o+1}$, where o is 3 to 7.

In certain embodiments of the functional fluorochemical oligomeric compound, $R^3$ is $C_{18}H_{37}$.

In certain embodiments of the functional fluorochemical oligomeric compound, X is H.

In certain embodiments of the functional fluorochemical oligomeric compound, $R^4$ is a divalent or trivalent (C1-C14) hydrocarbon group with optional heteroatoms. In certain embodiments, $R^4$ is a divalent or trivalent straight-chain or branched-chain (C1-C14) alkyl group, a divalent or trivalent (C3-C10)cycloalkyl group, or a divalent or trivalent straight-chain or branched-chain hetero(C1-C14)alkyl group. In certain embodiments, when t=1, $R^4$ is a divalent group (e.g., a straight-chain or branched-chain (C1-C14)alkylene group, a (C3-C10)cycloalkylene group, or a straight-chain or branched-chain hetero(C1-C14)alkylene group). In certain embodiments, $R^4$ is $-CH_2CH_2-$.

In certain embodiments of the functional fluorochemical oligomeric compound, $Z^1$ is $-OH$.

In certain embodiments of the functional fluorochemical oligomeric compound, $R^5$ is selected from H and a (C1-C4) alkyl group.

In certain embodiments of the functional fluorochemical oligomeric compound, each k is independently an 2 to 4.

In certain embodiments of the functional fluorochemical oligomeric compound, $R^8$ is Me.

In certain embodiments of the functional fluorochemical oligomeric compound, $R^9$ is Me.

A representative example of a suitable functional fluorochemical oligomeric compound includes the following structure (n=3):

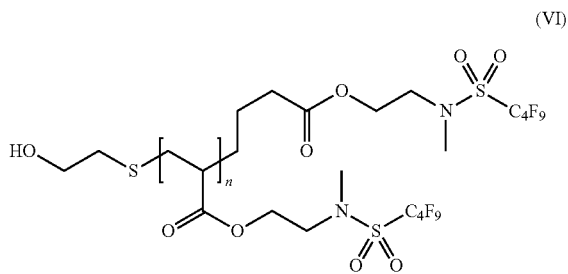

(VI)

In certain embodiments, the functional fluorochemical oligomeric compound is used in an amount sufficient to react with 1% to 10% of the isocyanate groups of the polyfunctional isocyanate compound. In certain embodiments, the functional fluorochemical oligomeric compound is used in an amount sufficient to react with 3% to 5% of the isocyanate groups of the polyfunctional isocyanate compound.

Polyfunctional Isocyanate Compound (Component (a))

In certain embodiments, the polyfunctional isocyanate compound is selected from a diisocyanate, a triisocyanate, and a combination thereof.

Polyfunctional isocyanate compounds useful in the present disclosure include multivalent aliphatic, alicyclic, or aromatic moiety attached to a blocked isocyanate, a biuret, an isocyanurate, or a uretdione, or mixtures thereof. Preferred polyfunctional isocyanate compounds contain at least two and preferably three or more —NCO groups. Compounds containing two —NCO groups include divalent aliphatic, alicyclic, araliphatic, or aromatic moieties to which the —NCO groups are attached. Preferred compounds containing three —NCO groups include isocyanatoaliphatic, isocyanatoalicyclic, or isocyanatoaromatic, monovalent moieties, which are attached to a biuret or an isocyanurate.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more.

The aliphatic polyfunctional isocyanate compounds generally provide better light stability than the aromatic compounds, and are preferred for treatment of fibrous substrates. Aromatic polyfunctional isocyanate compounds, on the other hand, are generally more economical and reactive toward polyoxyalkylene compounds and other isocyanate-reactive compounds than are aliphatic polyfunctional isocyanate compounds.

Suitable aromatic polyfunctional isocyanate compounds include, but are not limited to, those selected from the group consisting of 2,4-toluene diisocyanate (TDI), 2,6-toluene diisocyanate, an adduct of TDI with trimethylolpropane (available as DESMODUR CB from Bayer Corporation, Pittsburgh, Pa.), the isocyanurate trimer of TDI (available as DESMODUR IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methoxy-2,4-phenylene diisocyanate, 1-chlorophenyl-2,4-diisocyanate, and mixtures thereof.

Examples of useful alicyclic polyfunctional isocyanate compounds include, but are not limited to, those selected from the group consisting of dicyclohexylmethane diisocyanate ($H_{12}$MDI, commercially available as DESMODUR W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis(isocyanatomethyl)cyclohexane ($H_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as DESMODUR N-100 and N-3200 from Bayer Corporation, Pittsburgh, Pa.), the isocyanurate of HDI (available as DESMODUR N-3300 and DESMODUR N-3600 from Bayer Corporation, Pittsburgh, Pa.), a blend of the isocyanurate of HDI and the uretdione of HDI (available as DESMODUR N-3400 available from Bayer Corporation, Pittsburgh, Pa.), and mixtures thereof.

Examples of useful aryl aliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)-phenyl isocyanate, m-(3-isocyanatobutyl)-phenyl isocyanate, 4-(2-isocyanatocyclohexyl-methyl)-phenyl isocyanate, and mixtures thereof.

Preferred polyisocyanates, in general, include those selected from the group consisting of hexamethylene 1,6-diisocyanate (HDI), 1,12-dodecane diisocyanate isophorone diisocyanate, toluene diisocyanate, dicyclohexylmethane 4,4'-diisocyanate, MDI, derivatives of all the aforementioned, including DESMODUR N-100, N-3200, N-3300, N-3400, N-3600, and mixtures thereof.

Suitable commercially available polyfunctional isocyanates are exemplified by DESMODUR N-3200, DESMODUR N-3300, DESMODUR N-3400, DESMODUR N-3600, DESMODUR H (HDI), DESMODUR W (bis[4-isocyanatocyclohexyl]methane), MONDUR M (4,4'-diisocyanatodiphenylmethane), MONDUR TDS (98% toluene 2,4-diisocyanate), MONDUR TD-80 (a mixture of 80% 2,4 and 20% 2,6-toluene diisocyanate isomers), and DESMODUR N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE 3160 (American Cyanamid, Stamford, Conn.).

Monofunctional Fluorochemical Compound (Component (c))

In certain embodiments, monofunctional fluorochemical compounds suitable for use in the present disclosure include those that include at least one $R_f$ group (i.e., a fluoroaliphatic group, preferably with a fully fluorinated terminal group). The $R_f$ groups can contain straight chain, branched chain, or cyclic fluorinated alkylene groups or any combination thereof. The $R_f$ groups can optionally contain one or more heteroatoms (i.e., oxygen, sulfur, and/or nitrogen) in the carbon-carbon chain so as to form a carbon-heteroatom-carbon chain (i.e., a heteroalkylene group).

Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms, e.g., $CF_3O-$, $CF_3CF_2-$, $CF_3CF_2CF_2-$, $(CF_3)_2N-$, $(CF_3)_2CF-$, $SF_5CF_2-$. Perfluorinated aliphatic groups (i.e., those of the formula $C_nF_{2n+1}-$) wherein n is 2 to 12 inclusive are the preferred $R_f$ groups, with n=3 to 5 being more preferred and with n=4 being the most preferred.

In certain embodiments, the monofunctional fluorochemical compound (a "monofunctional" compound with respect to $Z^2$) is of the formula:

$$R_f^2-Y-R^6-Z^2$$

wherein:
$R_f^2$ is a perfluoroalkyl group or a perfluoroheteroalkyl group;

Y is a connecting group selected from a covalent bond, a sulfonamido group, a carboxamido group, a carboxyl group, and a sulfonyl group;

$R^6$ is a straight-chain or branched-chain (C1-C14)alkylene group, a (C3-C10)cycloalkylene group, or a straight-chain or branched-chain hetero(C1-C14)alkylene group; and $Z^2$ is $-NH_2$, $-SH$, $-OH$, $-N=C=O$, or $NR^7H$;

wherein $R^7$ is selected from phenyl, straight and branched aliphatic, alicyclic, and aliphatic ester groups.

In certain embodiments of the monofunctional fluorochemical compound, $R_f^2$ is a perfluoroalkyl group of 2 to 12 carbons. In certain embodiments, $R_f^2$ is a perfluoroalkyl group of 2 to 6 carbons. In certain embodiments, $R_f^2$ is a perfluoroalkyl group of 3 to 5 carbons.

In certain embodiments of the monofunctional fluorochemical compound, Y is sulfonamido.

In certain embodiments of the monofunctional fluorochemical compound, $R^6$ is $-CH_2CH_2-$.

In certain embodiments of the monofunctional fluorochemical compound, $Z^2$ is $-OH$.

In certain embodiments of the monofunctional fluorochemical compound, $R^7$ is selected from H and a (C1-C4) alkyl group.

Representative examples of useful monofunctional fluorochemical compounds include the following:
$CF_3(CF_2)_3SO_2N(CH_3)CH_2CH_2OH$, $CF_3(CF_2)_3SO_2N(CH_3)CH(CH_3)CH_2OH$, Representative examples of useful monofunctional fluorochemical compounds include the following:
$CF_3(CF_2)_3SO_2N(CH_3)CH_2CH(CH_3)NH_2$, $CF_3(CF_2)_3SO_2N(CH_2CH_3)CH_2CH_2SH$,
$CF_3(CF_2)_3SO_2N(CH_3)CH_2CH_2SCH_2CH_2OH$, $C_6F_{13}SO_2N(CH_3)(CH_2)_4OH$,
$CF_3(CF_2)_7SO_2N(H)(CH_2)_3OH$, $C_3F_7SO_2N(CH_3)CH_2CH_2OH$,
$CF_3(CF_2)_4SO_2N(CH_3)(CH_2)_4NH_2$, $C_4F_9SO_2N(CH_3)(CH_2)_{11}OH$,
$CF_3(CF_2)_5SO_2N(CH_2CH_3)CH_2CH_2OH$, $CF_3(CF_2)_5SO_2N(C_2H_5)(CH_2)_6OH$,
$CF_3(CF_2)_2SO_2N(C_2H_5)(CH_2)_4OH$, $CF_3(CF_2)_3SO_2N(C_3H_7)CH_2OCH_2CH_2CH_2OH$,
$CF_3(CF_2)_4SO_2N(CH_2CH_2CH_3)CH_2CH_2OH$, $CF_3(CF_2)_4SO_2N(CH_2CH_2CH_3)CH_2CH_2NHCH_3$,
$CF_3(CF_2)_3SO_2N(C_4HOCH_2CH_2NH_2$, $CF_3(CF_2)_3SO_2N(C_4H_9)(CH_2)_4SH$,
$CF_3(CF_2)_3CH_2CH_2OH$
$C_4F_9OC_2F_4OCF_2CH_2OCH_2CH_2OH$;
n-$C_6F_{13}CF(CF_3)CON(H)CH_2CH_2OH$; $C_6F_{13}CF(CF_3)CO_2C_2H_4CH(CH_3)OH$;
$C_3F_7CON(H)CH_2CH_2OH$; $C_3F_7O(CF(CF_3)CF_2O)_{1-36}CF(CF_3)CH_2OH$;
and the like, and mixtures thereof. If desired, other isocyanate-reactive functional groups may be used in place of those depicted.

In certain embodiments, the monofunctional fluorochemical compound is used in an amount sufficient to react with 60% to 90% of the isocyanate groups of the polyfunctional isocyanate compound. In certain embodiments, the monofunctional fluorochemical compound is used in an amount sufficient to react with 60% to 75% of the isocyanate groups of the polyfunctional isocyanate compound.

The Polyoxyalkylene Compound (Component (a))

In certain embodiments, the polyoxyalkylene compound is selected from a homopolymer of polyoxyethylene, a copolymer of polyoxyethylene and polyoxypropylene, and a combination thereof.

In certain embodiments, the polyoxyalkylene compounds suitable for use in the present disclosure include those polyoxyalkylene compounds that have an average functionality of greater than 1 (or about 2 to 5, or about 2 to 3, or about 2). In certain embodiments, difunctional compounds such as diols are used.

The isocyanate-reactive groups can be primary or secondary, with primary groups being preferred for their greater reactivity. Mixtures of compounds having different functionalities, for examples mixtures of polyoxyalkylene compounds having one, two, and three isocyanate-reactive groups, may be used provide the average is greater than 1. The polyoxyalkylene groups include those having 1 to 3 carbon atoms such as polyoxyethylene, polyoxypropylene, and copolymers thereof such as polymers having both oxyethylene and oxypropylene units.

Examples of polyoxyakylene compounds (i.e., polyoxyalkylene-containing compounds) include alkyl ethers of polyglycols such as e.g. methyl or ethyl ether of polyethylene glycol, hydroxy terminated methyl or ethyl ether of a random or block copolymer of ethylene oxide and propylene oxide, amino terminated methyl or ethyl ether of polyethyleneoxide, polyethylene glycol, polypropylene glycol, a hydroxy terminated copolymer (including a block copolymer) of ethylene oxide and propylene oxide, a mono- or diamino-terminated poly(alkylene oxide) such as JEFFAMINE ED, JEFFAMINE EDR-148 and poly(oxyalkylene) thiols. Commercially available aliphatic polyisocyanates include BAYGARD VP SP 23012, RUCOGUARD EPF 1421 and TUBICOAT Fix ICB.

Useful commercially available polyoxyalkylene compounds include CARBOWAX poly(ethylene glycol) materials in the number average molecular weight (Mn) range of from about 200 to about 2000 (available from Union Carbide Corp.); poly(propylene glycol) materials such as PPG-425 (available from Lyondell Chemicals); block copolymers of poly(ethylene glycol) and poly(propylene glycol) such as PLURONIC L31 (available from BASF Corporation); the "PeP" series (available from Wyandotte Chemicals Corporation) of polyoxyalkylene tetrols having secondary hydroxyl groups, for example, "PeP" 450, 550, and 650.

In certain embodiments, the polyoxyalkylene compound is used in an amount sufficient to react with 10% to 40% of the isocyanate groups of the polyfunctional isocyanate compound. In certain embodiments, the polyoxyalkylene compound is used in an amount sufficient to react with 20% to 35% of the isocyanate groups of the polyfunctional isocyanate compound.

Methods of Making Fluorochemical Composition

The chemical compositions of the present disclosure may be made according to the following synthesis. As one skilled in the art would understand, the order of the steps is nonlimiting and can be modified so as to produce a desired chemical composition.

In the synthesis, the monofunctional fluorochemical compound, functional fluorochemical oligomeric compound, and the polyfunctional isocyanate compound may be combined in one step. Alternatively, the polyfunctional isocyanate compound and the monofunctional fluorochemical compound may be reacted together. The resulting fluorochemical functional urethane compound may then be further reacted with one or more of the functional fluorochemical oligomeric compounds described above.

For example, the polyfunctional isocyanate compound and the monofunctional fluorochemical compound may be dissolved together under dry conditions, preferably in a solvent, followed by heating the resulting solution at approximately 40° C. to 80° C., preferably approximately 60° C. to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/polyoxyalkylene mixture may be used, but typically about 0.00005 to about 0.5 percent by weight is required, 0.02 to 0.1 percent by weight being preferred.

Suitable catalysts include, but are not limited to, tertiary amine and tin compounds. Examples of useful tin compounds include tin II and tin IV salts such as stannous octanoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred.

The resulting fluorochemical functional urethane compounds may be then further reacted with one or more of the functional fluorochemical oligomeric compounds described above. A functional fluorochemical oligomeric compound is added to the above reaction mixture, and reacts with a substantial portion of the remaining NCO groups. The above temperatures, dry conditions, and mixing are continued one-half to two hours, preferably one hour.

These compounds are further functionalized with polyoxyalkylene compounds, having an average functionality of greater than 1, described above by reacting any of the remaining NCO groups in the resulting mixture with one or more of the reactive polyoxyalkylene compounds described above. Thus, the polyoxyalkylene compound(s) is (are) added to the reaction mixture, using the same conditions as with the previous additions.

Treating Methods and Articles

The present disclosure provides a method for treating a substrate (e.g., a method for imparting water and oil repellency and antisoiling characteristics to a substrate). The method includes applying a treating composition to a substrate and allowing the treating composition to at least partially dry. In certain embodiments, the drying occurs at ambient temperature.

The treating composition (i.e., coating mixture) includes a fluorochemical composition as described herein, water, and optionally an organic solvent. Suitable organic solvents include alcohols, esters, glycol ethers, amides, ketones, hydrocarbons, chlorohydrocarbons, chlorocarbons, and mixtures thereof.

In certain embodiments, the treating composition includes 0.1 wt-% to 50 wt-% of a fluorochemical composition as described herein. In certain embodiments, the treating composition includes an aqueous solution, dispersion, or suspension.

In certain embodiments, the treating composition includes a surfactant. Examples of suitable surfactants include the sodium salts of aryl sulfonic acids.

In certain embodiments, the treating composition may include a stainblocking material to help impart stain resistance to a wide variety of fibrous substrates, particularly those that contain polyamide linkages. This may include fabrics, textiles, and carpets, such as, for example, nylon carpet, which may be less resistant to staining than polyester carpet. Examples of stainblocking materials may include sulfonated aromatic polymers and acrylic acid polymers.

The present disclosure also provides an article that includes a substrate having one or more surfaces and a fluorochemical composition as described herein disposed on one or more surfaces of the substrate. In certain embodiments, the substrate is a fibrous substrate (e.g., carpet).

The treating compositions of the present disclosure may be applied to a wide variety of fibrous substrates resulting in an article that displays durable water and oil repellency and antisoiling properties. Thus, an article of the present disclosure includes a fibrous substrate having a treatment derived from at least one fluorochemical composition of the present disclosure. After application and drying of the treating composition, the substrate displays durable water and oil repellency and antisoiling properties.

The treating compositions of the present disclosure can be applied to a wide variety of fibrous substrates including woven, knit, and nonwoven fabrics, textiles, carpets, leather, and paper. Preferred carpet substrates may include polyester and nylon carpet.

Fabric and textile fibrous substrates may be based on synthetic fibers, e.g. polyester, polyamide, and polyacrylate fibers or natural fibers, e.g. cellulose fibers as well as mixtures thereof. The fibrous substrate may be a woven as well as a nonwoven substrate. Preferred substrates are cellulosic materials such as cotton, rayon, TENCEL and blends of cellulosic materials. Substrates having nucleophilic groups, such as cotton, may be preferred because they can bond to the isocyanate groups of the fluorochemical compositions of the present disclosure, thereby increasing durability of the fiber treatment.

The treating composition may also be applied to other substrates including ceramic, stone, grout, and paint.

In certain embodiments, the resulting treated substrates derived from a fluorochemical composition of the present disclosure have been found to be water and oil repellent and resist soils and/or release soils after steam cleaning. The dried treatments have also been found to be durable and hence to resist being worn-off due to wear and abrasion from use and the elements.

In certain embodiments, fluorochemical compositions of the present disclosure demonstrate a value of at least 1, preferably at least 3, on polyester or nylon carpet according to the Water Repellency Test (described in the Examples Section). In certain embodiments, fluorochemical compositions of the present disclosure demonstrate a value of at least 1.5, preferably at least 3, on polyester or nylon carpet according to the Oil Repellency Test (described in the Examples Section).

Any application method known to one skilled in the art can be used including spraying, dipping, immersion, foaming, atomizing, aerosolizing, misting, flood-coating, and the like. To impart release/repellency/resistance characteristics to a fibrous substrate, the treating composition of the present disclosure is applied to the substrate and is allowed to dry at ambient temperature (i.e., room temperature) or elevated temperature.

In order to affect treatment of the fibrous substrate the fibrous substrate is contacted with a fluorochemical composition of the disclosure. For example, the substrate can be immersed in the treating composition. The treated substrate can then be run through a padder/roller to remove excess fluorochemical composition and dried. The treated substrate may be dried at room temperature by leaving it in air or may alternatively or additionally be subjected to a heat treatment, for example, in an oven. A heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, or 3 to 5 minutes, is suitable. Alternatively, the chemical composition can be applied by spraying the composition on the fibrous substrate.

An ambient drying process preferably takes place at approximately 15-35° C. (i.e., ambient or romm temperature) until dryness is achieved, up to approximately 24 hours. The choice of either heat-treatment or ambient drying often depends on the desired end-use. For consumer applications, where the composition may be applied to household laundry or carpeting, and ambient treatment is desired. For industrial applications, where the fibrous substrate, such as a textile might normally be exposed to elevated temperatures during production, an elevated temperature heat-treatment may be desirable. Generally, those composition containing blocked isocyanate groups are preferred where a heat-treatment is encountered.

The amount of the treating composition applied to the fibrous substrate is chosen so that a sufficiently high level of the desired properties are imparted to the substrate surface without substantially affecting the look and feel of the treated substrate. Such amount is usually such that the resulting amount of the fluorochemical urethane composition on the treated fibrous substrate will be between 0.05% and 5% by weight based on the weight of the fibrous substrate, known as solids on fiber or SOF. The amount that is sufficient to impart desired properties can be determined empirically and can be increased as necessary or desired.

Significantly, as shown in the Examples Section, the amount of fluorine in a composition of the present disclosure can be less than conventional compositions and provide equivalent or better oil and/or water repellency.

Exemplary Embodiments

Embodiment 1 is a fluorochemical composition comprising:
a fluorochemical urethane compound comprising the reaction product of components comprising:
a polyfunctional isocyanate compound;
a polyoxyalkylene compound;
a monofunctional fluorochemical compound; and
a functional fluorochemical oligomeric compound of the formula:

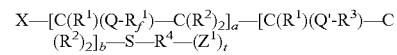

wherein:
the sum of a+b is a number such that the compound is oligomeric (in certain embodiments, a+b is at least 3, and in certain embodiments a+b is up to 25), and a is at least 1;
t is 1 or 2;
each $R^1$ is independently hydrogen, a halogen, or a straight chain or branched chain (C1-C4)alkyl group;
each $R^2$ is independently hydrogen or a straight-chain or branched-chain (C1-C4)alkyl group;
Q and Q' are each independently a covalent bond or an organic linking group;
$R_f^1$ is a fluoroaliphatic group comprising a fully fluorinated terminal group;
$R^3$ is a fluorine-free aliphatic group having 12 or more carbon atoms;

X is hydrogen or a group derived from a free radical initiator;

$R^4$ is a divalent organic linking group when t=1 or a trivalent organic linking group when t=2; and $Z^1$ is —$NH_2$, —SH, —H, —N=C=O, or $NR^5H$;

wherein $R^5$ is selected from phenyl, straight and branched aliphatic, alicyclic, and aliphatic ester groups.

Embodiment 2 is the fluorochemical composition of embodiment 1 wherein t is 1 and $R^4$ is a straight-chain or branched-chain (C1-C14)alkylene group, a (C3-C10)cycloalkylene group, or a straight-chain or branched-chain hetero(C1-C14)alkylene group.

Embodiment 3 is the fluorochemical composition of embodiment 1 or 2 wherein the polyfunctional isocyanate compound is selected from a diisocyanate, a triisocyanate, and a combination thereof.

Embodiment 4 is the fluorochemical composition of any one of embodiments 1 through 3 wherein the monofunctional fluorochemical compound is of the formula:

$$R_f^2—Y—R^6—Z^2$$

wherein:

$R_f^2$ is a perfluoroalkyl group or a perfluoroheteroalkyl group;

Y is a connecting group selected from a covalent bond, a sulfonamido group, a carboxamido group, a carboxyl group, and a sulfonyl group;

$R^6$ is a straight-chain or branched-chain (C1-C14)alkylene group, a (C3-C10)cycloalkylene group, or a straight-chain or branched-chain hetero(C1-C14)alkylene group; and $Z^2$ is —$NH_2$, —SH, —OH, —N=C=O, or $NR^7H$;

wherein $R^7$ is selected from phenyl, straight and branched aliphatic, alicyclic, and aliphatic ester groups.

Embodiment 5 is the fluorochemical composition of embodiment 4 wherein $R_f^2$ is a perfluoroalkyl group of 2 to 6 carbons.

Embodiment 6 is the fluorochemical composition of embodiment 5 wherein $R_f^2$ is a perfluoroalkyl group of 3 to 5 carbons.

Embodiment 7 is the fluorochemical composition of any of embodiments 1 through 6 wherein the polyoxyalkylene compound is selected from a homopolymer of polyoxyethylene, a copolymer of polyoxyethylene and polyoxypropylene, and a combination thereof.

Embodiment 8 is the fluorochemical composition of any of embodiments 1 through 7 wherein:

the polyoxyalkylene compound is used in an amount sufficient to react with 10% to 40% of the isocyanate groups of the polyfunctional isocyanate compound;

the functional fluorochemical oligomeric compound is used in an amount sufficient to react with 1% to 10% of the isocyanate groups of the polyfunctional isocyanate compound; and the monofunctional fluorochemical compound is used in an amount sufficient to react with 60% to 90% of the isocyanate groups of the polyfunctional isocyanate compound.

Embodiment 9 is the fluorochemical composition of embodiment 8 wherein:

the polyoxyalkylene compound is used in an amount sufficient to react with 20% to 35% of the isocyanate groups of the polyfunctional isocyanate compound;

the functional fluorochemical oligomeric compound is used in an amount sufficient to react with 3% to 5% of the isocyanate groups of the polyfunctional isocyanate compound; and the monofunctional fluorochemical compound is used in an amount sufficient to react with 60% to 75% of the isocyanate groups of the polyfunctional isocyanate compound.

Embodiment 10 is the fluorochemical composition of any of embodiments 1 through 9 wherein the polyoxyalkylene compound has an average functionality of greater than 1.

Embodiment 11 is the composition of any of embodiments 1 through 10 wherein a+b of the functional fluorochemical oligomeric compound is at least 3.

Embodiment 12 is the fluorochemical composition of embodiment 11 wherein a+b of the fluorochemical oligomeric funtional compound is 3 to 20.

Embodiment 13 is the fluorochemical composition of any of embodiments 1 through 12 wherein $R_f^1$ has the structure $C_oF_{2o+1}$, where o is 3 to 7.

Embodiment 14 is the fluorochemical composition of any of embodiments 1 through 13 wherein each of Q and Q' of the functional fluorochemical oligomeric compound are independently selected from the following structures:

—$SO_2NR^8(CH_2)_kO(O)C$—
—$CONR^8(CH_2)_kO(O)C$—
—$(CH_2)_kO(O)C$—
—$CH_2CH(OR^9)CH_2O(O)C$—
—$(CH_2)_kC(O)O$—
—$(CH_2)_kSC(O)$—
—$(CH_2)_kO(CH_2)_kO(O)C$—
—$(CH_2)_kS(CH_2)_kO(O)C$—
—$(CH_2)_kSO_2(CH_2)_kO(O)C$—
—$(CH_2)_kS(CH_2)_kOC(O)$—
—$(CH_2)_kSO_2NR^8(CH_2)_kO(O)C$—
—$(CH_2)_kSO_2$—
—$SO_2NR^8(CH_2)_kO$—
—$SO_2NR^8(CH_2)_k$—
—$(CH_2)_kO(CH_2)_kC(O)O$—
—$(CH_2)_kSO_2NR^8(CH_2)_kC(O)O$—
—$(CH_2)_kSO_2(CH_2)_kC(O)O$—
—$CONR^8(CH_2)_kC(O)O$—
—$(CH_2)_kS(CH_2)_kC(O)O$—
—$CH_2CH(OR^9)CH_2C(O)O$—
—$SO_2NR^8(CH_2)_kC(O)O$—
—$(CH_2)_kO$—
—$C_kH_{2k}OC(O)NH$—
—$C_kH_{2k}NR^8C(O)NH$—
—$OC(O)NR^8(CH_2)_k$—
—$(CH_2)_kNR^8$—
and
—$(CH_2)_kNR^8C(O)O$— wherein:

each k is independently 0 to 20;

$R^8$ is hydrogen, an aryl group, or a (C1-C4)alkyl group; and $R^9$ is (C1-C20)alkyl group.

Embodiment 15 is the fluorochemical composition of any of embodiments 1 through 14 wherein b of the functional fluorochemical oligomeric compound is 0.

Embodiment 16 is a treating composition comprising the fluorochemical composition of any of embodiments 1 through 15 and water and an optional organic solvent.

Embodiment 17 is the treating composition of embodiment 16 wherein an organic solvent is present.

Embodiment 18 is the treating composition of embodiment 16 or 17 wherein the mixture comprises an aqueous solution, dispersion, or suspension.

Embodiment 19 is the treating composition of any of embodiments 16 through 18 further comprising a surfactant.

Embodiment 20 is the treating composition of any of embodiments 16 through 19 comprising 0.1 wt-% to 50 wt-% of the composition of embodiment 1.

Embodiment 21 is a method for treating a substrate (e.g., a method for imparting water and oil repellency and anti-soiling characteristics to a substrate), the method comprising applying the treating composition of any of embodiments 16 through 20, and allowing the treating composition to dry.

Embodiment 22 is the method of embodiment 21 wherein said substrate is a fibrous substrate.

Embodiment 23 is the method of embodiment 21 or 22 wherein the treating composition is dried at ambient temperature.

Embodiment 24 is an article comprising a substrate having one or more surfaces and the composition of any of embodiments 1 through 23 disposed on one or more surfaces of the substrate.

Embodiment 25 is the article of embodiment 24 wherein the substrate is a fibrous substrate.

Embodiment 26 is the article of embodiment 24 or 25 wherein the composition is dried.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

| Descriptor | Formula, structure and/or name | Availability |
|---|---|---|
| MeFBSE | $C_4F_9SO_2N(CH_3)CH_2CH_2OH$; 2-(N-methylperfluorobutylsulfonamido) ethanol | Can be prepared using the general procedure described in PCT Publication WO 01/30873 A1, Example 2, Part A |
| MeFBSEA | 2-(N-methylperfluorobutylsulfonamide) ethyl acrylate; $C_4F_9SO_2N(CH_3)CH_2CH_2OC(O)CH=CH_2$ | Can be prepared using the general procedure described in PCT Publication WO 01/30873 A1, Example 2, Parts A & B. |
| MeFBSEMA | 2-(N-methylperfluorobutylsulfonamido) ethyl methacrylate; $C_4F_9SO_2N(CH_3)CH_2CH_2OC(O)C(CH_3)=CH_2$ | Can be prepared using the general procedure described in PCT Publication WO 01/30873 A1, Example 2, Parts A & B, except using methacrylic acid in place of acrylic acid. |
| $C_6F_{13}CH_2CH_2$ acrylate | 1H, 1H, 2H, 2H-tridecafluoro-n-octyl acrylate; $C_6F_{13}CH_2CH_2OC(O)CH=CH_2$ | TCI America, Portland, OR |
| ODA | octadecylacrylate | Sigma-Aldrich, St. Louis, MO |
| ME | 2-mercaptoethanol; $HSCH_2CH_2OH$ | Sigma-Aldrich, St. Louis, MO |
| VAZO 67 | 2,2-azobis-(2-methylbutyronitrile) - catalyst | Chemours, Wilmington, DE |
| DBTDL | dibutyl tin dilaurate - catalyst | Sigma-Aldrich, St. Louis, MO |
| EA | ethyl acetate | EMD Millipore, Billerica, MA |
| MIBK | methyl isobutyl ketone | EMD Millipore, Billerica, MA |
| PEG | CARBOWAX PEG 1450; polyethylene glycol | Dow Chemical, Midland, MI |
| MPEG | CARBOWAX MPEG 750; methoxypolyethylene glycol | Dow Chemical, Midland, MI |
| CALFAX DB-45 | C12 (branched) sodium diphenyl oxide disulfonate - anionic surfactant | Pilot Chemical, Cincinnati, OH |
| CALFAX 16L-35 | C16 (linear) sodium diphenyl oxide disulfonate - anionic surfactant | Pilot Chemical, Cincinnati, OH |
| RHODOCAL DS-10 | sodium dodecylbenzene sulfonate (98% active flakes) - anionic surfactant | Solvay (Rhodia), Cranbury, NJ |
| $C_6F_{13}CH_2CH_2OH$ | 1H, 1H, 2H, 2H-tridecafluoro-1-n-octanol | TCI America, Portland, OR |
| SA | stearyl alcohol | Sigma-Aldrich, St. Louis, MO |
| N-100 | DESMODUR N-100; aliphatic polyisocyanate resin based on hexamethylene diisocyanate (HDI) | Bayer Material Science LLC, Pittsburgh, PA |
| N-3300 | DESMODUR N-3300; aliphatic polyisocyanate (HDI trimer) | Bayer Material Science LLC, Pittsburgh, PA |

The carpet substrates used were 1) a 40 oz/yd$^2$ (1356 g/m$^2$) untreated polyester filament carpet available from Beaulieu America, Dalton, Ga. (Manufacturing Style Number: P2895; Manufacturing Color: Greige; Custom Dyed: Blue Moon), and 2) a 46 oz/yd$^2$ (1560 g/m$^2$) untreated Nylon 66 INVISTA available from Beaulieu America, Dalton, Ga. (Manufacturing Style Number: 02364; Style Name: Impeccable; Manufacturing Color: Greige; Custom Dyed: Blue Moon).

Simulated Flex-Nip Application Procedure

The Simulated Flex-Nip Application Procedure is used to simulate the flex-nip operation used by carpet mills to apply fluorochemical compositions to carpet.

In this test, a carpet sample measuring approximately 12 inches (in)×12 inches (in) (30.5 centimeters (cm)×30.5 centimeters (cm)) is immersed in hot water maintained at ~200-210° F. (approximately 93-99° C.) for approximately 1 minute. The carpet sample is then dipped in room temperature (approximatly 25° C.) deionized (DI) water. Water is extracted from the wet sample by spinning in a Bock Centrifugal Extractor until the sample is damp.

The aqueous treating composition is then applied on to the carpet by placing the carpet sample, carpet fiber side down, in a metal tray containing the treating composition. The treating composition contains sufficient fluorochemical (and/or other optional components) to give the desired percent solids on fiber (% SOF), and is prepared by dissolving or dispersing the material and optionally the desired amount of salt in DI water and adjusting the pH to a value of 3.5 (unless otherwise specified) using 10% aqueous sulfuric acid. The weight of the aqueous treating solution in the glass tray is approximately 4.0 times the weight of the carpet sample. The carpet sample absorbs the entire volume of treating solution by being pressed using a hydraulic press at 100 psi (Model number RC1010, Enerpac, Milwaukee, Wis.) and rotating the carpet 360 degrees so all four sides are equally pressed. This results in a wet pick-up of approximately 350 to 400%.

Then the wet, treated carpet sample is steamed for 90 seconds in a Werner Mathis Steamer, immersed briefly in a 5 gallon (20 liter) pail half full of cold water to remove residual, excess treatment composition, spun to dampness using the centrifugal extractor, and dried for 25 minutes in a Despatch oven set to 255° F. (124° C.).

Test Methods
Water Repellency Test

In the water repellency test, samples are challenged to penetrations by blends of DI water and isopropyl alcohol (IPA). Each blend is assigned a rating number as shown below:

| Water Repellency Rating Number | Water/IPA Blend (% by volume) |
| --- | --- |
| 0 | 100% water |
| 1 | 90/10 water/IPA |
| 2 | 80/20 water/IPA |
| 3 | 70/30 water/IPA |
| 4 | 60/40 water/IPA |
| 5 | 50/50 water/IPA |
| 6 | 40/60 water/IPA |
| 7 | 30/70 water/IPA |
| 8 | 20/80 water/IPA |
| 9 | 10/90 water/IPA |
| 10 | 100% IPA |

In running the Water Repellency Test, a test sample is placed on a flat, horizontal surface. Five small drops of water or a water/IPA mixture are gently placed at points at least two inches apart on the sample. If, after observing for ten seconds at a 45° angle, four of the five drops are visible as a sphere or a hemisphere, the test sample is deemed to pass the test. The reported water repellency rating corresponds to the highest numbered water or water/IPA mixture for which the test sample passes the described test.

It is desirable to have a water repellency rating of at least 1, preferably a rating of at least 3.

Oil Repellency Test

In the oil repellency test, samples are challenged to penetration by oil or oil mixtures of varying surface tensions. Oils and oil mixtures are given a rating corresponding to the following:

| Oil Repellency Rating Number | Oil Composition |
| --- | --- |
| 0 | (fails KAYDOL mineral oil) |
| 1 | KAYDOL mineral oil |
| 1.5 | 85/15 (vol) mineral oil/n-hexadecane |
| 2 | 65/35 (vol) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The Oil Repellency Test is run in the same manner as is the Water Repellency Test, with the reported oil repellency rating corresponding to the highest oil or oil mixture for which the test sample passes the test.

It is desirable to have an oil repellency rating of at least 1.5, preferably a rating of at least 3.

Steam Cleaning Procedure

The following procedure is used to evaluate the cleaning effectiveness and durability of carpet treatments or for other circumstances requiring consistent cleaning of carpets.

Carpet samples were firmly secured to a piece of wood with the dimensions of 30 cm×30 cm with a thickness of 1 cm.

A board cleaning machine was used to minimize the variability that is inherently associated with technique and operator differences in manually operated carpet and steam cleaners. The machine cleans each board of carpet samples in three steps with shampooing in the first step, rinsing in the second step and water extraction in the third step.

The cleaning machine has three stations with a spray nozzle and vacuum cleaner head at each one. The first station sprays soap solution on the carpet samples immediately preceding a vacuum head that moves slowly over the surface of the carpet. The next two stations spray only hot water for rinsing immediately in front of the vacuum head as it passes over the carpet, removing as much water as possible. A turntable carries the boards with the carpet samples to each station, resulting in a 90° turn of the samples at each station.

A metering pump delivers the soap solution from a reservoir into the water line connected to the first head. A hot water heater supplies all of the water at a temperature of 65° C. The soap solution was made from 1.0 kilogram of Bane-Clene P.C.A. Formula 5 (Powdered Cleaning Agent) dissolved in 250 liters of water.

"Walk-on" Soiling Test

The relative soiling potential of each treatment was determined by challenging both treated and untreated carpet samples under defined "walk-on" soiling test conditions and comparing the relative soiling levels. The test is conducted by mounting treated and 12 in×12 in (30.5 cm×30.5cm) untreated carpet squares samples on particle board, placing the samples on the floor in a commercial location, and allowing the samples to be soiled by normal foot traffic. The amount of foot traffic in each of these areas is monitored, and the position of each sample within a given location is changed daily using a pattern designed to minimize the effects of position and orientation upon soiling.

Following a specific soil challenge period, measured in number of cycles where one cycle equals approximately 10,000 foot-traffics (this simulates about one year of residential use), the treated samples are removed and vacuumed to remove unadhered debris. Performance data are obtained, the samples are steam cleaned as described above, and then subjected to another cycle of 10,000 foot-traffics. The samples are then removed and vacuumed to remove unadhered debris. Performance data is again obtained, the samples are steam cleaned as described above, and then subjected to additional cycles if desired.

The amount of soil present on a given sample is determined using colorimetric measurements, making the assumption that the amount of soil on a given sample is directly proportional to the difference in color between an unsoiled sample and the corresponding sample after soiling. The three CIE color coordinates, L*, a* and b*, of the unsoiled and subsequently soiled samples are measured using a Minolta 310 Chroma Meter (available from Minolta, New York, N.Y.) with a D65 illumination source. The color difference value, ΔE, is calculated using the following formula:

$$\Delta E = \sqrt{(\Delta L^*)^2 + (\Delta a^*)^2 + (\Delta b^*)^2}$$

where:

$$\Delta L^* = L^*(\text{soiled}) - L^*(\text{unsoiled})$$

$$\Delta a^* = a^*(\text{soiled}) - a^*(\text{unsoiled})$$

$$\Delta b^* = b^*(\text{soiled}) - b^*(\text{unsoiled})$$

ΔE values calculated from these colorimetric measurements have been shown to be qualitatively in agreement with values from older, visual evaluations such as the soiling tests suggested by AATCC, and have the additional advantage of higher precision, being unaffected by the evaluation environment or subjective operator differences. Final ΔE values for each sample are calculated as an average of between five and seven replicates.

The performance improvement of a sample above the untreated control sample, reported as ΔΔE, was calculated using the equation below:

$$\Delta\Delta E = \Delta E(\text{soiled untreated control}) - \Delta E(\text{soiled treated})$$

Preparation of Fluorochemical Oligomer Alcohols (FCOA)

FCOA-1 (Structure VI): (MeFBSEA)$_4$SCH$_2$CH$_2$OH

MeFB SEA was converted to (MeFBSEA)$_4$SCH$_2$CH$_2$OH using the general procedure described in U.S. Pat. No. 7,078,456 (Column 19, lines 51-59 under the section titled "Preparation of FCUR-1 . . . ").

FCOA-2: (C$_6$F$_{13}$CH$_2$CH$_2$acrylate)$_4$SCH$_2$CH$_2$OH

Using the general procedure described in U.S. Pat. No. 7,078,456 (Column 19, lines 52-59 under the section titled "Preparation of FCUR-1 . . . "), FCOA-2 was prepared using 25.0 g of C$_6$F$_{13}$CH$_2$CH$_2$acrylate, 1.17 g of ME, 8.7 g of EA, and 0.183 g of VAZO 67, affording a 73.7% solids solution of FCOA-2.

FCOA-3: (MeFBSEA)$_3$(ODA)SCH$_2$CH$_2$OH

Using the general procedure described in U.S. Pat. No. 7,078,456 (Column 19, lines 52-59 under the section titled "Preparation of FCUR-1 . . . "), FCOA-3 was prepared using 30.0 g of MeFBSEA, 7.9 g of ODA, 1.9 g of ME, 13.3 g of EA, and 0.289 g of VAZO 67, affording a 73.9% solids solution of FCOA-3.

FCOA-4: (MeFBSEA)$_2$(ODA)$_2$SCH$_2$CH$_2$OH

Using the general procedure described in U.S. Pat. No. 7,078,456 (Column 19, lines 52-59 under the section titled "Preparation of FCUR-1 . . . "), FCOA-4 was prepared using 20.0 g of MeFBSEA, 15.8 g of ODA, 1.9 g of ME, 12.6 g of EA, and 0.274 g of VAZO 67, affording a 72.7% solids solution of FCOA-4.

FCOA-5: (MeFBSEA)(ODA)$_4$SCH$_2$CH$_2$OH

Using the general procedure described in U.S. Pat. No. 7,078,456 (Column 19, lines 52-59 under the section titled "Preparation of FCUR-1 . . . "), FCOA-5 was prepared using 20.5 g of MeFBSEA, 64.6 g of ODA, 3.91 g of ME, 90 g of EA, and 0.35 g of VAZO 67, affording a 50% solids solution of the FCOA-5.

FCOA-6: (MeFBSEMA)$_4$SCH$_2$CH$_2$OH

Using the general procedure described in U.S. Pat. No. 7,078,456 (Column 19, lines 52-59 under the section titled "Preparation of FCUR-1 . . . "), MeFBSEMA was converted to (MeFBSEMA)4SCH2CH2OH using 100 g of MeFBSEMA, 18.4 g of ME, 119 g of EA, and 0.4 g of VAZO 67, affording a 50% solids solution of the FCOA-6.

Example 1

FCUE-1: Fluorochemical Urethane Emulsion

A 2-L flask was charged with 148.5 g of MeFB SE, 29.1 g of FCOA-1 and 325 g of MIBK. The batch was heated to 50° C. and 121.9 g of N-3300 and 0.081 g of DBTDL were added and the batch was heated at 74° C. for 1 hour. 151.6 g of PEG was then added and the mixture was stirred at 80° C. for 1 hour. 305 g of MIBK was added and the solventborne urethane batch was cooled to 23° C. 112.3 g of the above solution was then placed in a 500 mL 3-neck round-bottom flask. 1.25 g of CALFAX DB-45 was then added. The batch was heated to 50° C. and 211 g of DI water that had also been heated to 50° C. was added with rapid stirring. The batch was then stripped at atmospheric pressure, slowly raising the temperature from 89° C. to 100° C. The resulting emulsion was then cooled to 23° C. The % solids were measured and determined to be 24.7%.

Example 2

FCUE-2: with MPEG

The solventborne urethane of Example 2 was prepared using the general procedure described for Example 1, using 35.1 g of MeFBSE, 6.6 g of FCOA-1, 28.6 of N-3300, 31.3 g of MPEG, and 135 g of EA as a solvent. This solventborne urethane material was then converted to a waterborne material using the general procedure described in Example 1 above, except the CALFAX DB-45 surfactant was eliminated. The % solids were measured and determined to be 25.6%.

Example 3

FCUE-3: 3.3% FCOA-1

The solventborne urethane of Example 3 was prepared using the general procedure described for Example 1, using 33.1 g of MeFBSE, 4.3 g of FCOA-1, 28.6 g of N-3300, 35.2 g of PEG, and 135 g of EA as a solvent. This solventborne urethane material was converted to a waterborne urethane material using the general procedure described in Example 1 above, except CALFAX 16L-35 was used as the surfactant. The % solids were measured and determined to be 12.9%.

Example 4

FCUE-4: 4.0% FCOA-1

The solventborne urethane of Example 4 was prepared using the general procedure described for Example 1, using 51.6 g of MeFBSE, 7.6 g of FCOA-1, 40.9 g of N-3300, 45.1 g of PEG, and 154 g of MIBK as a solvent. This solventborne urethane material was converted to a waterborne urethane material using the general procedure described in Example 1. The % solids were measured and determined to be 23.3%.

Example 5

FCUE-5: 10.0% FCOA-1

The solventborne urethane of Example 5 was prepared using the general procedure described for Example 1, using 47.0 g of MeFBSE, 18.7 g of FCOA-1, 38.4 g of N-3300, 41.6 g of PEG, and 154 g of MIBK as a solvent. This solventborne urethane material was converted to a waterborne urethane material using the general procedure described in Example 1. The % solids were measured and determined to be 25.1%.

Example 6

FCUE-6: FCOA-2/N-MeFBSE Example

The solventborne urethane of Example 6 was prepared using the general procedure described for Example 1, using 49.5 g of MeFBSE, 9.7 g of FCOA-2 (instead of FCOA-1), 40.6 g of N-3300, 49.6 g of PEG, and 159 g of MIBK. This solventborne urethane material was converted to a waterborne urethane material using the general procedure described in Example 1. The % solids were measured and determined to be 25.1%.

Example 7

FCUE-7: FCOA-1/C6 Alcohol Example

The solventborne urethane of Example 7 was prepared using the general procedure described for Example 1, using 49.5 g of $C_6F_{13}CH_2CH_2OH$, 9.7 g of FCOA-1, 40.6 g of N-3300, 48.0 g of PEG, and 194 g of MIBK. This solventborne urethane material was converted to a waterborne urethane material using the general procedure described in Example 1. The % solids were measured and determined to be 20.0%.

Example 8

FCUE-8: FCOA-2/C6 Alcohol Example

The solventborne urethane of Example 8 was prepared using the general procedure described for Example 1, using 49.5 g of $C_6F_{13}CH_2CH_2OH$, 9.7 g of FCOA-2, 40.6 g of N-3300, 46.0 g of PEG, and 154 g of MIBK. This solventborne urethane material was converted to a waterborne urethane material using the general procedure described in Example 1. The % solids were measured and determined to be 24.6%.

Example 9

FCUE-9: FCOA-6(MeFBSEMA)$_4$SCH$_2$CH$_2$OH

The solventborne urethane of Example 9 was prepared was prepared using the general procedure described for Example 1, using 49.5 g of MeFBSE, 14.7 g of FCOA-6 instead of FCOA-2, 40.6 g of N-3300, 50.5 g of PEG, and 204 g of MIBK. This solventborne urethane material was converted to a waterborne urethane material using the general procedure described in Example 1. The % solids were measured and determined to be 24.4%.

Example 10

FCUE-10: FCOA-5(MeFBSEA)(ODA)$_4$SCH$_2$CH$_2$OH

The solventborne urethane of Example 10 was prepared using the general procedure described for Example 1, using 49.5 g of MeFBSE, 14.7 g of FCOA-5, 40.6 g of N-3300, 50.5 g of PEG, and 199 g of MIBK. This solventborne urethane material was converted to a waterborne urethane material using the general procedure described in Example 1. The % solids were measured and determined to be 23.9%.

Example 11

FCUE-11: FCOA-3(MeFBSEA)$_3$(ODA)SCH$_2$CH$_2$OH

The solventborne urethane of Example 11 was prepared using the general procedure described for Example 1, using 49.5 g of MeFBSE, 9.8 g of FCOA-3, 40.6 g of N-3300, 49.6 g of PEG, and 159 g of MIBK. This solventborne urethane material was converted to a waterborne urethane material using the general procedure described in Example 1. The % solids were measured and determined to be 25.1%.

Example 12

FCUE-12: FCOA-4(MeFBSEA)$_2$(ODA)$_2$SCH$_2$CH$_2$OH

The solventborne urethane of Example 12 was prepared using the general procedure described for Example 1, using 49.5 g of MeFBSE, 9.8 g of FCOA-4, 40.6 g of N-3300, 49.2 g of PEG, and 159 g of MIBK. This solventborne urethane material was converted to a waterborne urethane material using the general procedure described in Example 1. The % solids were measured and determined to be 24.8%.

Comparative Example CE-1

FCOA-1/SA/N-100

The solventborne urethane of Comparative Example CE-1 was prepared using the general procedure described for Example 1, using 26.7 g of FCOA-1, 76.0 g of N-100, 104.0 g of SA, and 310 g of EA. This solventborne urethane material was converted to a waterborne urethane material using the general procedure described in Example 1 above, except that RHODOCAL DS-10 was used as the surfactant. The % solids were measured and determined to be 24.3%.

Comparative Example CE-2

FCOA-1/SA/N-100 with Acrylic Extender

A waterborne urethane like that of Comparative Example CE-1 was blended with a waterborne 50/50 EMA/MMA acrylic extender (prepared as described in U.S. Pat. No.

7,078,456, Column 19 under the section titled "Preparation of EMA/MMA 50/50") in a 2:1 solids ratio.

Comparative Example CE-3

A waterborne urethane was prepared as described in Example 6 of U.S. Pat. No. 6,890,360.

Comparative Example CE-4

A waterborne urethane was prepared as described in "Preparation of FCUR-1" of U.S. Pat. No. 7,078,456.

Comparative Example CE-5

A waterborne urethane was prepared as described in Example 13 of U.S. Pat. No. 7,078,456.

The fluorochemical compositions prepared in the Examples and Comparative Examples were then applied to polyester carpet samples, except for Example 1A, which was applied to nylon carpet. The compositions were all applied at substantially equal percent solids on fiber (theoretical target of 0.14% solids). The performance characteristics of the treated carpet samples were evaluated using the above described methods and procedures. Results are provided in Tables 1 and 2.

The repellency data in Table 1 represents performance before any Walk-On Soiling testing was carried out. The repellency data in Table 2 represents performance after one cycle of Walk-On Soiling testing was carried out (before any steam cleaning). The ΔΔE1 data in Table 2 represents performance after one cycle of Walk-On Soiling testing was carried out (before any steam cleaning). The ΔΔE2 data in Table 2 represents performance after two cycles of Walk-On Soiling testing was carried out (after one steam cleaning). Cells in Table 2 that do not have any data means that data was not obtained.

The data shows that with less fluorine (e.g., 27% less fluorine than in CE3 and 42% less fluorine than in CE3), the compositions of the present disclosure generally provide equivalent or better oil and/or water repellency.

TABLE 1

| Example | Theoretical ppm Fluorine | Oil Repellency (OR) | Water Repellency (WR) |
|---|---|---|---|
| 1 | 248 | 5 | 6 |
| 1a | 248 | 4.5 | 6 |
| 2 | 248 | 5 | 3 |
| 3 | 248 | 4.5 | 6 |
| 4 | 248 | 5 | 5.5 |
| 5 | 248 | 5 | 5 |
| 6 | 248 | 6 | 4 |
| 7 | 248 | 5.3 | 3 |
| 8 | 248 | 5.5 | 4 |
| 9 | 248 | 4.7 | 5 |
| 10 | 248 | 5 | 5.3 |
| 11 | 248 | 6 | 6 |
| 12 | 248 | 5.7 | 5.3 |
| CE1 | 248 | 3.5 | 5 |
| CE2 | 248 | 3.5 | 4.5 |
| CE3 | 340 | 5 | 4 |
| CE4 | 424 | 4.5 | 4 |
| CE5 | 248 | 2 | 2 |

TABLE 2

| Example | Oil Repellency (OR) | Water Repellency (WR) | ΔΔE1 | ΔΔE2 |
|---|---|---|---|---|
| 1 | 2 | 1 | 4.1 | 1.6 |
| 1a |  |  | 3.7 | 2.8 |
| 2 | 2 | 2 | 2.5 |  |
| 3 |  |  | 0.9 |  |
| 4 |  |  | 2.0 |  |
| 5 |  |  | 1.4 |  |
| 6 | 3 | 2 | 2.7 | 0.9 |
| 7 | 2 | 1 | 2.7 | 2.3 |
| 8 |  |  | −0.2 |  |
| 9 | 2 | 2 | 4.1 | 1.0 |
| 10 | 2 | 1 | 3.8 | 1.3 |
| 11 | 3 | 2 | 3.7 | 2.5 |
| 12 | 3 | 2 | 3.4 | 1.1 |
| CE1 | 3 | 2 | 1.5 |  |
| CE2 |  |  | 2.2 |  |
| CE3 |  |  | 1.9 |  |
| CE4 |  |  | 1.7 |  |
| CE5 |  |  | 1.5 |  |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A fluorochemical composition comprising:
   a fluorochemical urethane compound comprising the reaction product of components comprising:
     a polyfunctional isocyanate compound;
     a polyoxyalkylene compound, wherein the polyoxyalkylene compound is used in an amount sufficient to react with 10% to 40% of the isocyanate groups of the polyfunctional isocyanate compound;
     a monofunctional fluorochemical compound, wherein the monofunctional fluorochemical compound is used in an amount sufficient to react with 60% to 90% of the isocyanate groups of the polyfunctional isocyanate compound; and
     a functional fluorochemical oligomeric compound of the formula:

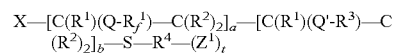

$$X-[C(R^1)(Q-R_f^1)-C(R^2)_2]_a-[C(R^1)(Q'-R^3)-C(R^2)_2]_b-S-R^4-(Z^1)_t$$

wherein:
     the sum of a+b is a number such that the compound is oligomeric, and a is at least 1;
     t is 1 or 2;
     each $R^1$ is independently hydrogen, a halogen, or a straight chain or branched chain (C1-C4)alkyl group;
     each $R^2$ is independently hydrogen or a straight-chain or branched-chain (C1-C4)alkyl group;
     Q and Q' are each independently a covalent bond or an organic linking group;
     $R_f^1$ is a fluoroaliphatic group comprising a fully fluorinated terminal group;
     $R^3$ is a fluorine-free aliphatic group having 12 or more carbon atoms;

X is hydrogen or a group derived from a free radical initiator;

$R^4$ is a divalent organic linking group when t=1 or a trivalent organic linking group when t=2; and $Z^1$ is —NH$_2$, —SH, —OH, —N=C=O, or —NR$^5$H;

wherein $R^5$ is selected from phenyl, straight and branched aliphatic, alicyclic, and aliphatic ester groups wherein the functional fluorochemical oligomeric compound is used in an amount sufficient to react with 1% to 10% of the isocyanate groups of the polyfunctional isocyanate compound.

2. The fluorochemical composition of claim 1 wherein t is 1 and $R^4$ is a straight-chain or branched-chain (C1-C14) alkylene group, a (C3-C10)cycloalkylene group, or a straight-chain or branched-chain hetero(C1-C14)alkylene group.

3. The fluorochemical composition of claim 1 wherein the polyfunctional isocyanate compound is selected from a diisocyanate, a triisocyanate, and a combination thereof.

4. The fluorochemical composition of claim 1 wherein the monofunctional fluorochemical compound is of the formula:

$$R_f^2\text{—Y—}R^6\text{—}Z^2$$

wherein:

$R_f^2$ is a perfluoroalkyl group or a perfluoroheteroalkyl group;

Y is a connecting group selected from a covalent bond, a sulfonamido group, a carboxamido group, a carboxyl group, and a sulfonyl group;

$R^6$ is a straight-chain or branched-chain (C1-C14)alkylene group, a (C3-C10)cycloalkylene group, or a straight-chain or branched-chain hetero(C1-C14)alkylene group; and $Z^2$ is —NH$_2$, —SH, —OH, —N=C=O, or —NR$^7$H;

wherein $R^7$ is selected from phenyl, straight and branched aliphatic, alicyclic, and aliphatic ester groups.

5. The fluorochemical composition of claim 4 wherein $R_f^2$ is a perfluoroalkyl group of 2 to 12 carbons.

6. The fluorochemical composition of claim 1 wherein the polyoxyalkylene compound is selected from a homopolymer of polyoxyethylene, a copolymer of polyoxyethylene and polyoxypropylene, and a combination thereof.

7. The fluorochemical composition of claim 1 wherein the polyoxyalkylene compound has an average functionality of greater than 1.

8. The fluorochemical composition of claim 1 wherein a+b of the functional fluorochemical oligomeric compound is at least 3.

9. The fluorochemical composition of claim 8 wherein a+b of the functional fluorochemical oligomeric compound is 3 to 20.

10. The fluorochemical composition of claim 1 wherein $R_f^1$ has the structure $C_oF_{2o+1}$, where o is 3 to 7.

11. The fluorochemical composition of claim 1 wherein each of Q and Q' of the functional fluorochemical oligomeric compound are independently selected from the following structures:

—SO$_2$NR$^8$(CH$_2$)$_k$O(O)C—
—CONR$^8$(CH$_2$)$_k$O(O)C—
—(CH$_2$)$_k$O(O)C—
—CH$_2$CH(OR$^9$)CH$_2$O(O)C—
—(CH$_2$)$_k$C(O)O—
—(CH$_2$)$_k$SC(O)—
—(CH$_2$)$_k$O(CH$_2$)$_k$O(O)C—
—(CH$_2$)$_k$S(CH$_2$)$_k$O(O)C—
—(CH$_2$)$_k$SO$_2$(CH$_2$)$_k$O(O)C—
—(CH$_2$)$_k$S(CH$_2$)$_k$OC(O)—
—(CH$_2$)$_k$SO$_2$NR$^8$(CH$_2$)$_k$O(O)C—
—(CH$_2$)$_k$SO$_2$—
—SO$_2$NR$^8$(CH$_2$)$_k$O—
—SO$_2$NR$^8$(CH$_2$)$_k$—
—(CH$_2$)$_k$O(CH$_2$)$_k$C(O)O—
—(CH$_2$)$_k$SO$_2$NR$^8$(CH$_2$)$_k$C(O)O—
—(CH$_2$)$_k$SO$_2$(CH$_2$)$_k$C(O)O—
—CONR$^8$(CH$_2$)$_k$C(O)O—
—(CH$_2$)$_k$S(CH$_2$)$_k$C(O)O—
—CH$_2$CH(OR$^9$)CH$_2$C(O)O—
—SO$_2$NR$^8$(CH$_2$)$_k$C(O)O—
—(CH$_2$)$_k$O—
—C$_k$H$_{2k}$—OC(O)NH—
—C$_k$H$_{2k}$—NR$^8$C(O)NH—
—OC(O)NR$^8$(CH$_2$)$_k$—
—(CH$_2$)$_k$NR$^8$—
and
—(CH$_2$)$_k$NR$^8$C(O)O— wherein:

each k is independently 0 to 20;

$R^8$ is hydrogen, an aryl group, or a (C1-C4)alkyl group; and $R^9$ is (C1-C20)alkyl group.

12. The fluorochemical composition of claim 1 wherein b of the functional fluorochemical oligomeric compound is 0.

13. A treating composition comprising the fluorochemical composition of claim 1, water, and an optional organic solvent.

14. The treating composition of claim 13 wherein the organic solvent is present.

15. The treating composition of claim 14 wherein the treating composition is an aqueous solution, dispersion, or suspension.

16. The treating composition of claim 15 further comprising a surfactant.

17. A method for treating a substrate comprising applying the treating composition of claim 13, and allowing the treating composition to dry.

18. An article comprising a substrate having one or more surfaces and the fluorochemical composition of claim 1 disposed on one or more surfaces of the substrate.

* * * * *

UNITED STATES PATENT AND TRADEMARK OFFICE
CERTIFICATE OF CORRECTION

PATENT NO. : 10,800,871 B2  
APPLICATION NO. : 15/767259  
DATED : October 13, 2020  
INVENTOR(S) : Dave Amos Page 1 of 2

It is certified that error appears in the above-identified patent and that said Letters Patent is hereby corrected as shown below:

In the Specification

Column 5-6  
Line 36-38 (approx.) (Structure IV), delete:

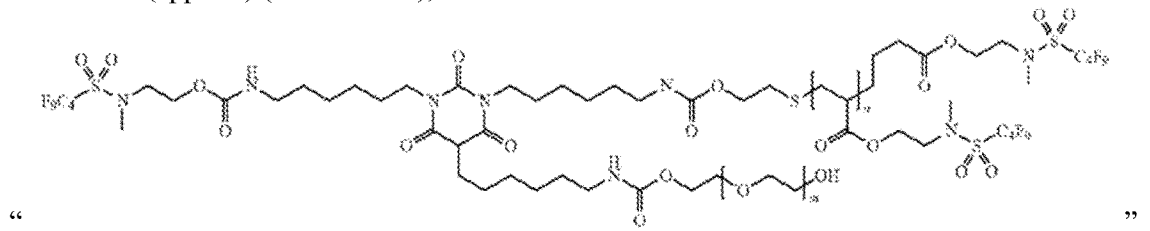

"  "

And insert:

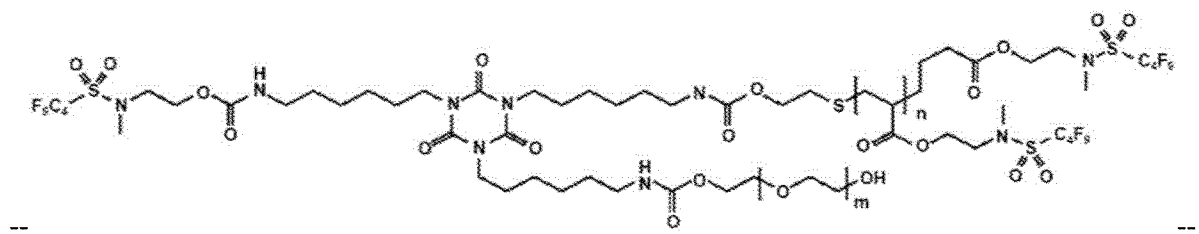

--  --

Column 7-8  
Line 1-14 (approx.), delete:

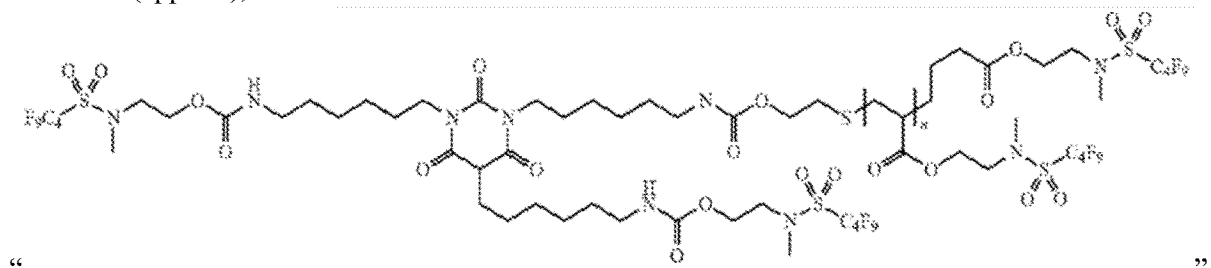

"  "

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*

And insert:
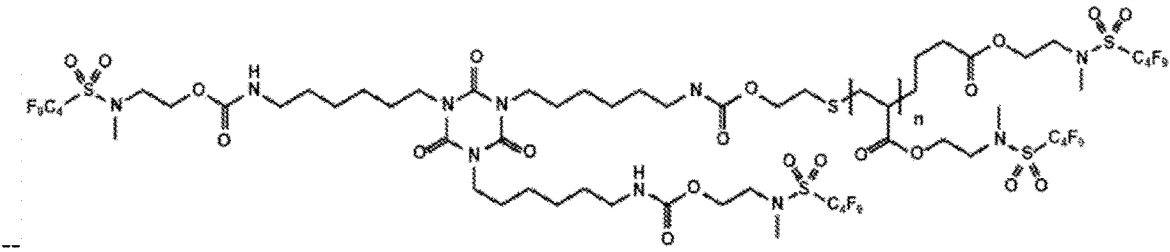
--                                                                                                      --